(12) United States Patent
Mori et al.

(10) Patent No.: US 8,977,103 B2
(45) Date of Patent: Mar. 10, 2015

(54) VIDEO DATA PROCESSING APPARATUS AND VIDEO DATA PROCESSING METHOD

(75) Inventors: Toshiki Mori, Kodaira (JP); Yoshiro Osaki, Kawasaki (JP); Naoko Satoh, Hachioji (JP); Kiyoshi Yamaguchi, Hino (JP); Yasuyuki Ushio, Kawasaki (JP); Kenji Kimiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1030 days.

(21) Appl. No.: 12/507,565

(22) Filed: Jul. 22, 2009

(65) Prior Publication Data

US 2010/0066915 A1   Mar. 18, 2010

(30) Foreign Application Priority Data

Sep. 12, 2008   (JP) ................................. 2008-235141

(51) Int. Cl.
*H04N 5/92* (2006.01)
*G11B 27/32* (2006.01)
*G11B 27/10* (2006.01)
*G11B 27/30* (2006.01)
*G11B 27/34* (2006.01)
*H04N 21/845* (2011.01)
*H04N 5/44* (2011.01)

(52) U.S. Cl.
CPC ............ *G11B 27/329* (2013.01); *G11B 27/105* (2013.01); *G11B 27/3027* (2013.01); *G11B 27/34* (2013.01); *H04N 21/8456* (2013.01); *G11B 2220/61* (2013.01); *H04N 5/4403* (2013.01)
USPC .......................................... 386/241; 386/248

(58) Field of Classification Search
None
See application file for complete search history.

(56) References Cited

U.S. PATENT DOCUMENTS

| | | | |
|---|---|---|---|
| 5,608,533 | A | 3/1997 | Okamoto et al. |
| 5,862,294 | A | 1/1999 | Sawagata |

(Continued)

FOREIGN PATENT DOCUMENTS

| | | |
|---|---|---|
| EP | 1768122 A1 | 3/2007 |
| JP | 6-062369 | 3/1994 |

(Continued)

OTHER PUBLICATIONS

Decision of Rejection issued by the Japanese Patent Office in Japanese Patent Application No. 2008-235141, mailed Jul. 5, 2011, total of 2 pages.

(Continued)

*Primary Examiner* — William C Vaughn, Jr.
*Assistant Examiner* — Eileen Adams
(74) *Attorney, Agent, or Firm* — Finnegan, Henderson, Farabow, Garrett & Dunner, LLP

(57) ABSTRACT

A video data processing apparatus includes a reading unit reading video data from a video data file recorded on a randomly accessible storage medium in response to a first control signal, and reading position data indicating a frame position of the video data in the video data file from the video data file recorded on the storage medium in response to a second control signal, a memory storing the position data read by the reading unit, and a controller controlling the reading unit by outputting the second control signal before the outputting of the first control signal, and controlling the reading unit by outputting the first control signal with a designation of particular video data to be read indicated by the position data stored in the memory, in response to a request to execute a process to the video data file.

16 Claims, 14 Drawing Sheets

(56) References Cited

U.S. PATENT DOCUMENTS

| | | | |
|---|---|---|---|
| 6,002,834 A | 12/1999 | Hirabayashi et al. | |
| 6,021,250 A | 2/2000 | Hyodo et al. | |
| 2006/0004685 A1* | 1/2006 | Pyhalammi et al. | 707/1 |
| 2006/0010269 A1* | 1/2006 | Leibbrandt | 710/74 |
| 2007/0186162 A1* | 8/2007 | Kaku | 715/721 |
| 2013/0061263 A1* | 3/2013 | Issa et al. | 725/32 |

FOREIGN PATENT DOCUMENTS

| | | |
|---|---|---|
| JP | 11-261964 | 9/1999 |
| JP | 2002-184159 | 6/2002 |
| JP | 2003-046948 | 2/2003 |
| JP | 2004-104337 | 4/2004 |
| JP | 2004-128938 | 4/2004 |
| JP | 2005-244441 | 9/2005 |
| KR | 10-2007-28375 | 3/2007 |
| WO | WO 02/19690 A2 | 3/2002 |

OTHER PUBLICATIONS

Notice of Reasons for Rejection issued by the Japanese Patent Office in Japanese Patent Application No. 2008-235141, mailed Jul. 8, 2010.
Notification for Filing Opinion issued by the Korean Patent Office in Korean Patent Application No. 10-2009-0066909, mailed Nov. 8, 2010, 7 pages.
EPO Communication dated Dec. 15, 2009, including European Search Report for EP Application No. 09009555.5 (7 pages).

* cited by examiner

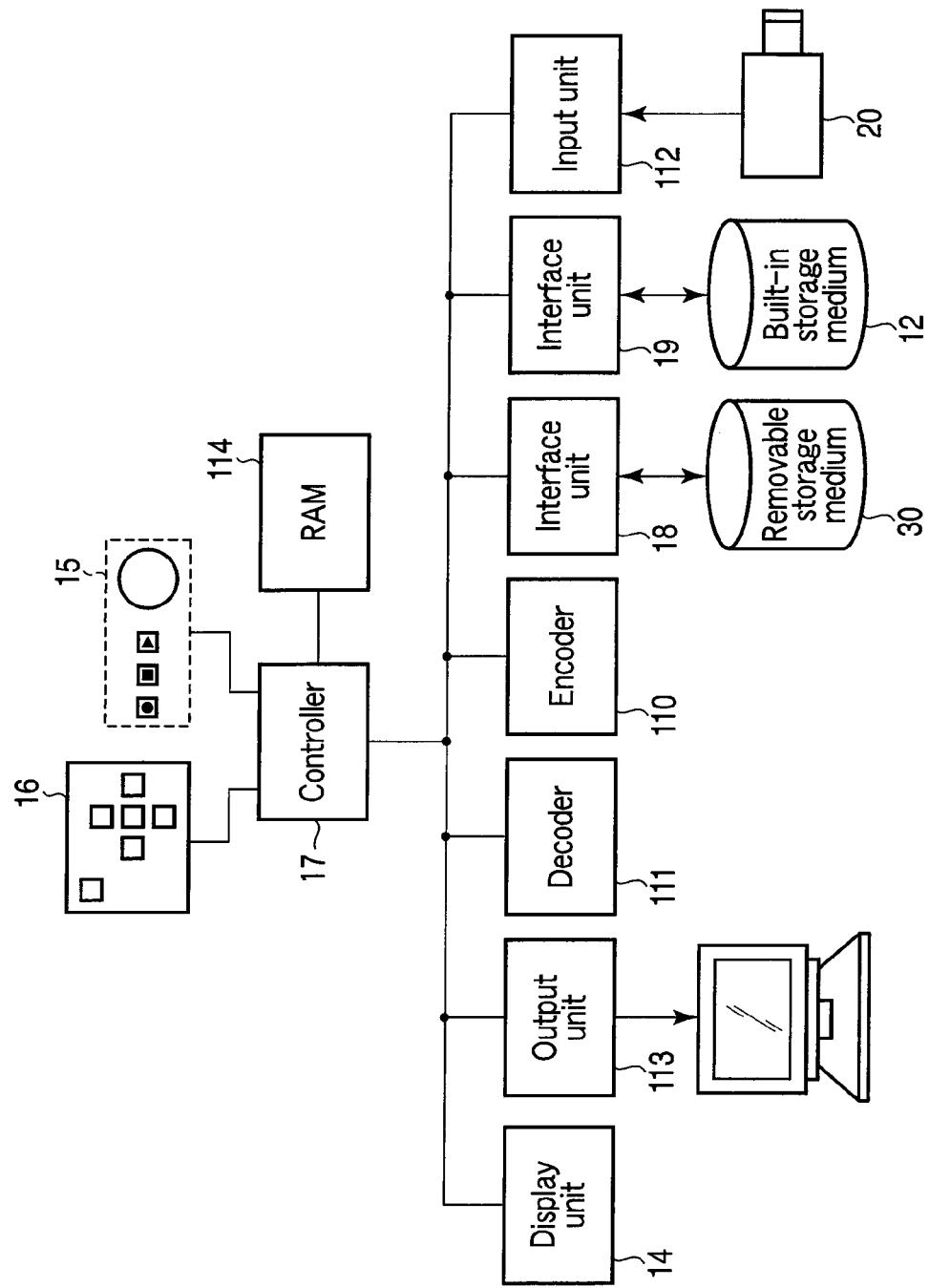
F I G. 3

| Number of frames from leading head | Number of bytes from leading head |
|---|---|
| 1 | a |
| 2 | b |
| 3 | c |
| 4 | d |
| : | : |
| : | : |
| n-1 | : |
| n | : |

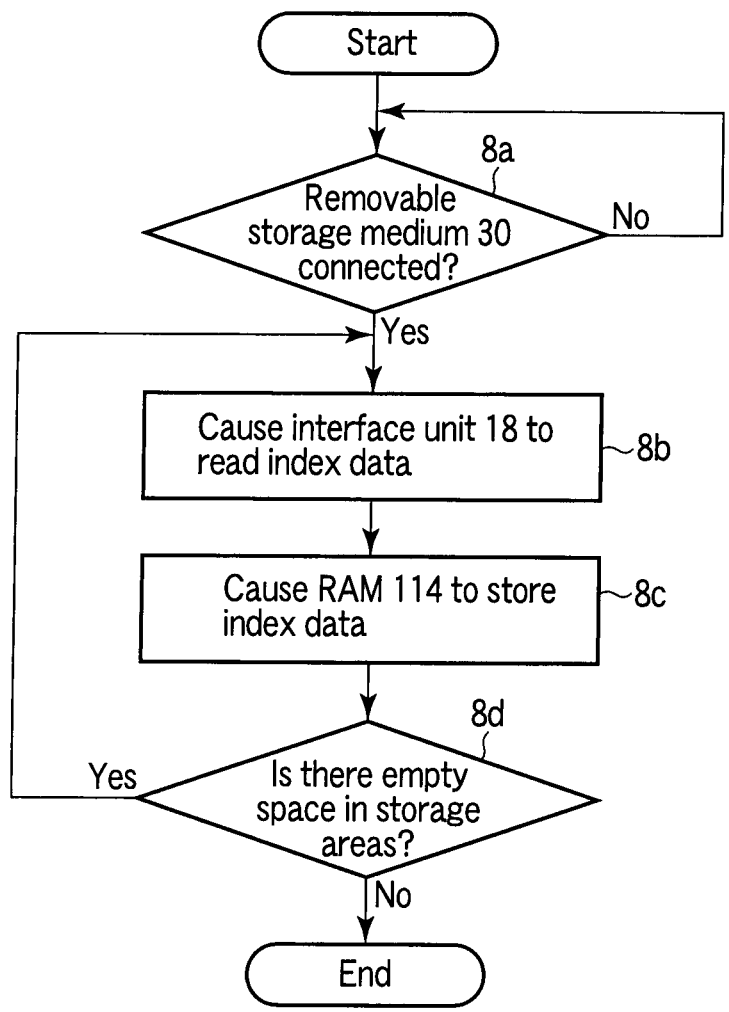
F I G. 8

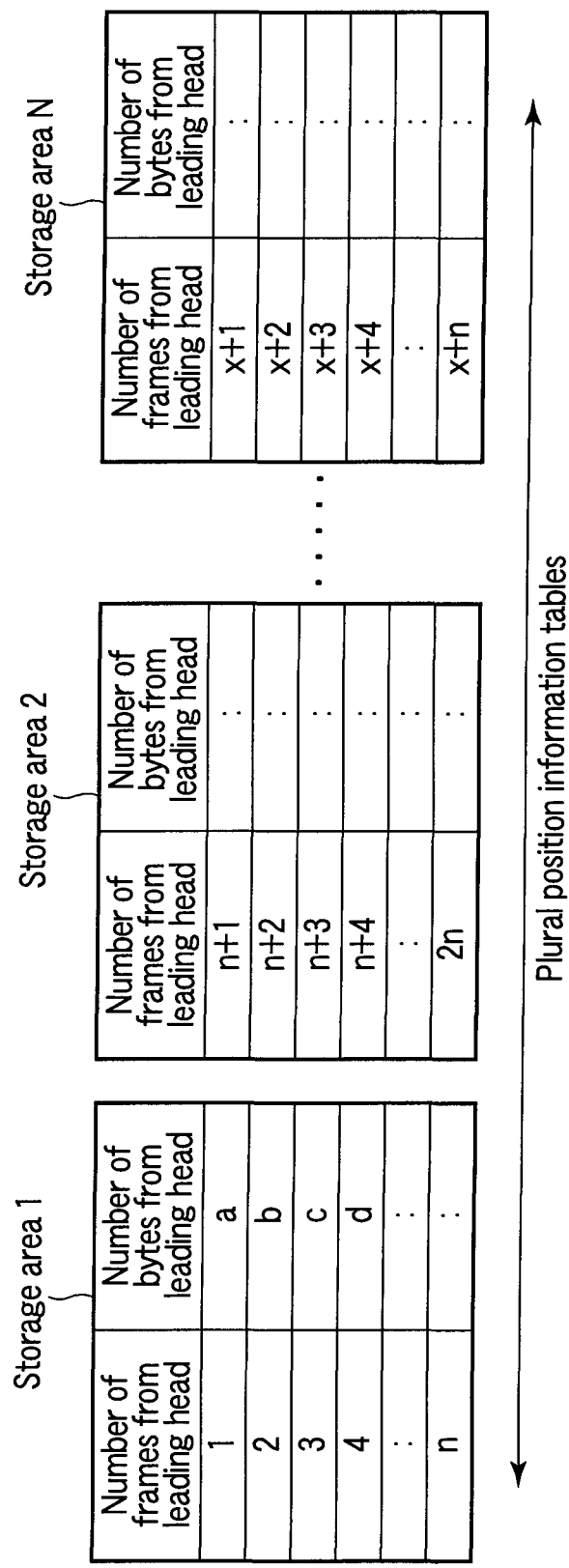
F I G. 9

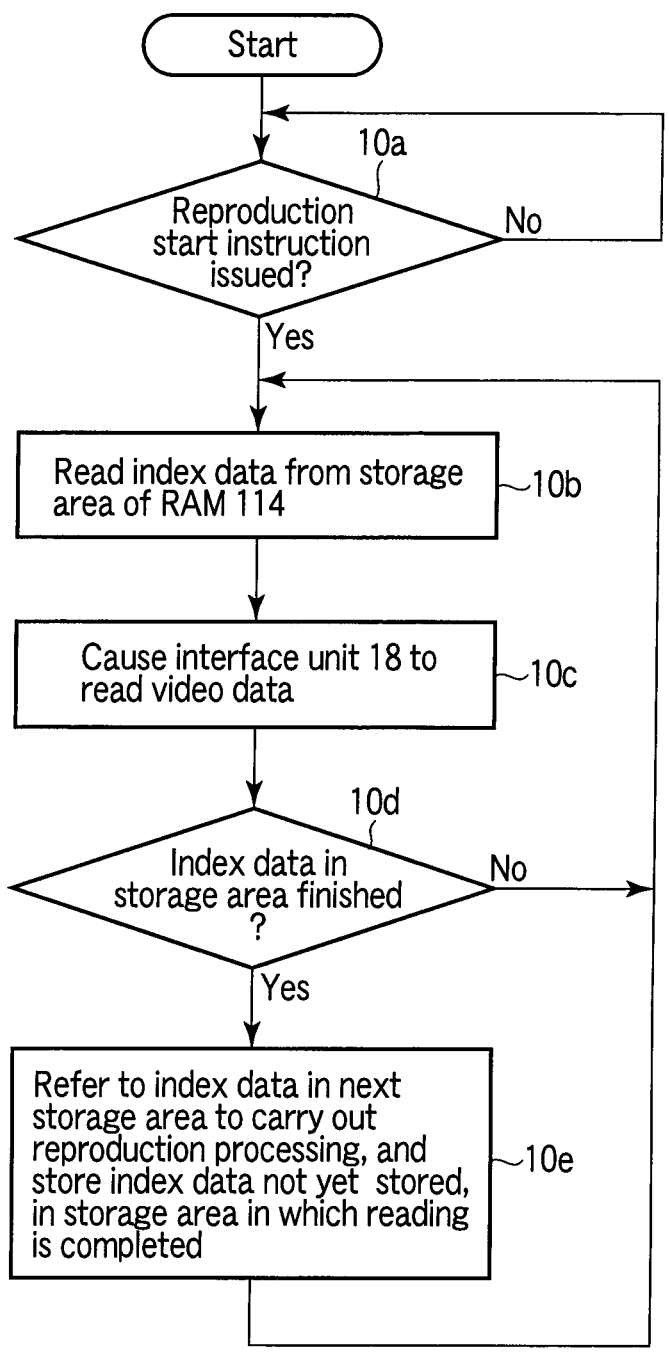
F I G. 10

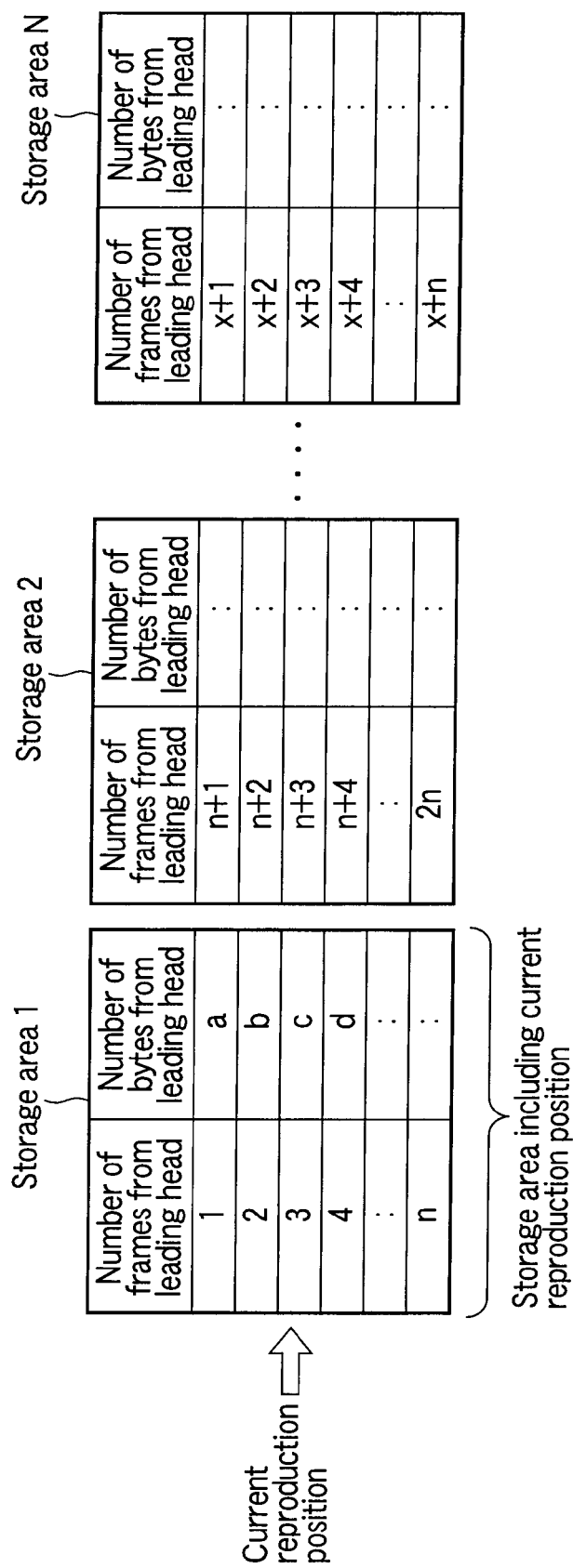
F I G. 11

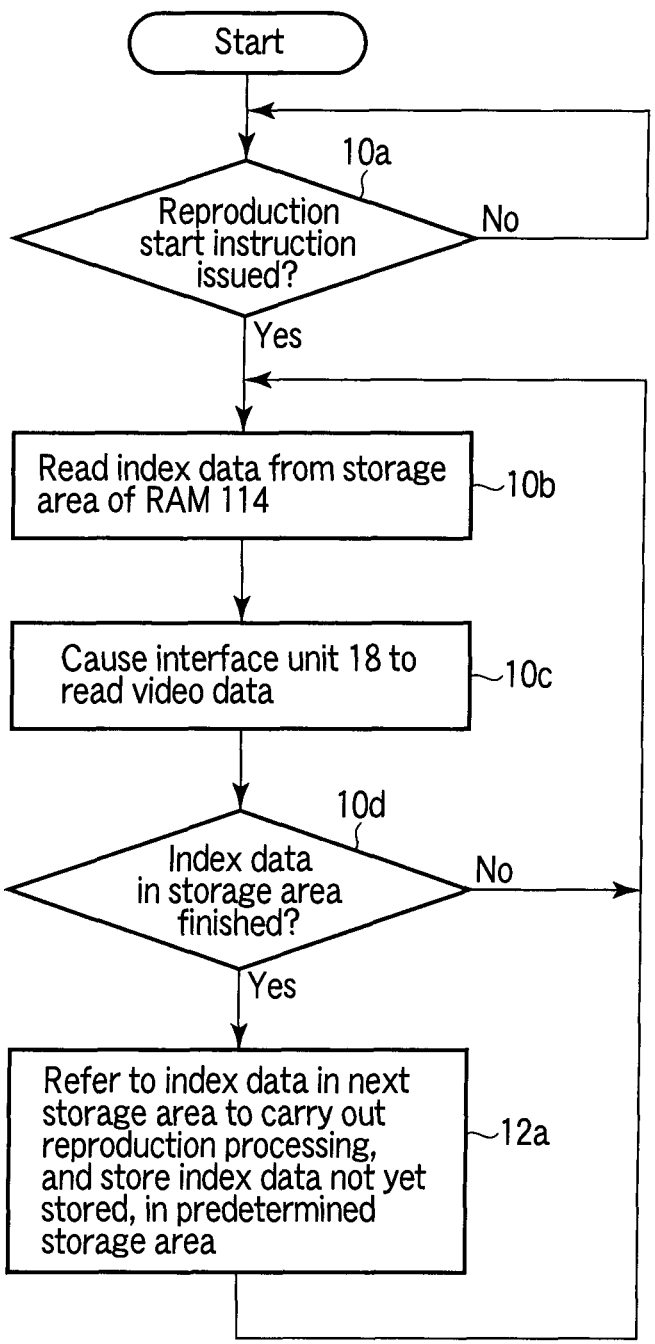
F I G. 12

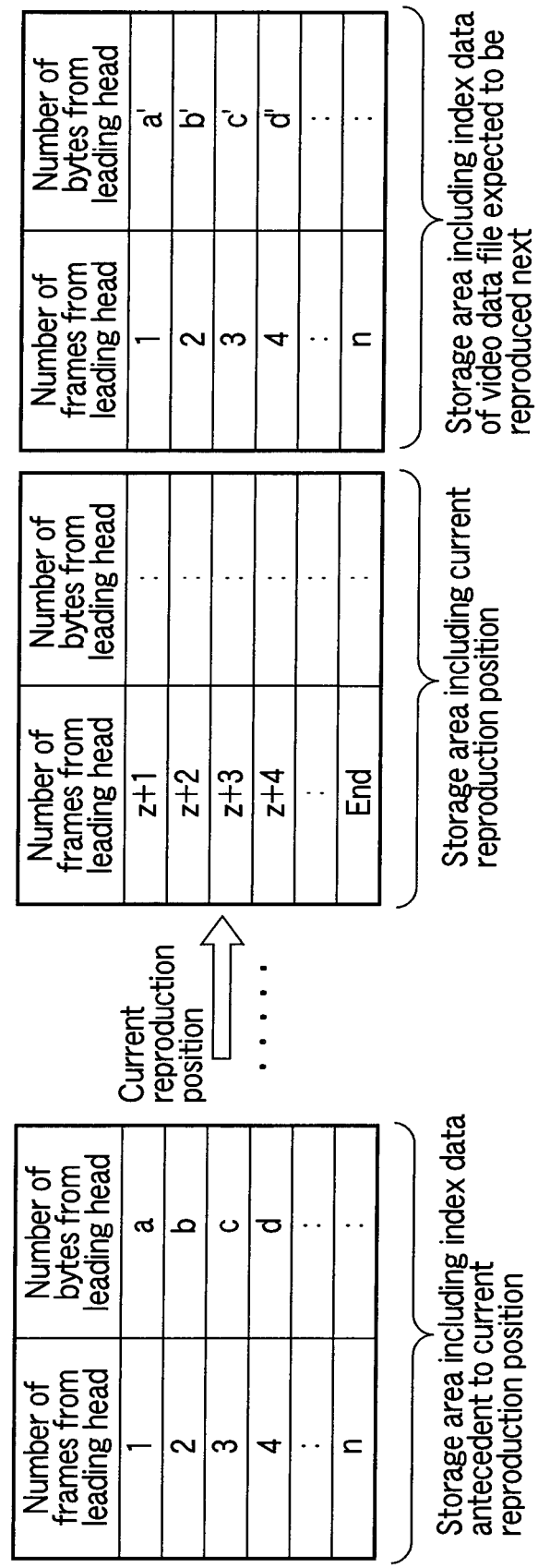
F I G. 14

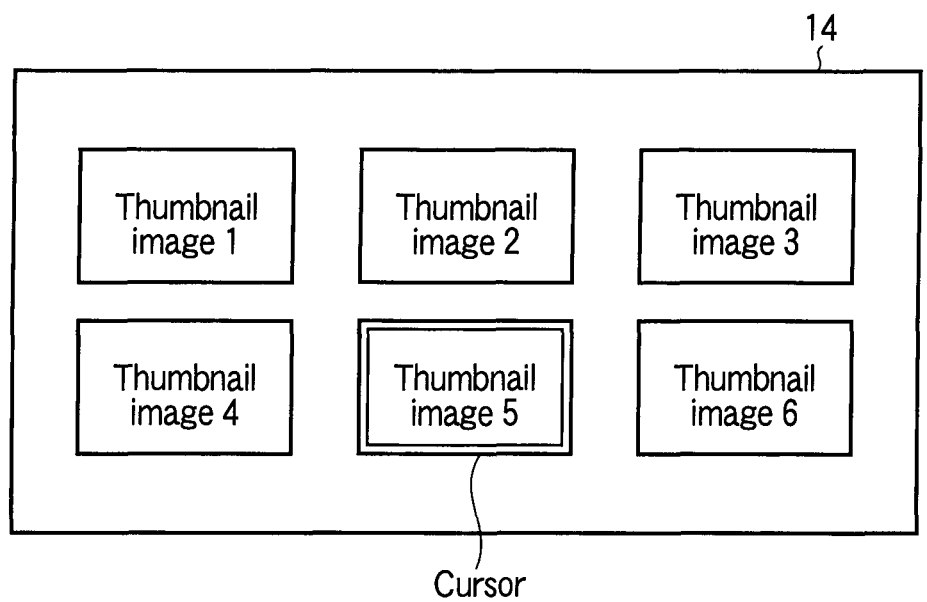
F I G. 16

VIDEO DATA PROCESSING APPARATUS AND VIDEO DATA PROCESSING METHOD

CROSS-REFERENCE TO RELATED APPLICATIONS

This application is based upon and claims the benefit of priority from prior Japanese Patent Application No. 2008-235141, filed Sep. 12, 2008, the entire contents of which are incorporated herein by reference.

BACKGROUND OF THE INVENTION

1. Field of the Invention

The present invention relates to a video data processing apparatus and video data processing method for reproducing video data recorded on an attachable/detachable semiconductor storage medium.

2. Description of the Related Art

Heretofore, as for a video data processing apparatus for commercial use employed in a broadcasting station or the like, a system in which video data is recorded on a tape has been the main stream. In the video data processing apparatus of this kind, it is necessary to record video data in sequence from the leading head of a tape. Accordingly, in order to reproduce the recorded data, it is necessary to acquire a desired reproduction position by carrying out fast-forwarding or the like of the tape. Thus, a lot of time has been required to start reproduction.

In recent years, a semiconductor storage medium such as a flash memory has become to be used in place of the tape (for example, Jpn. Pat. Appln. KOKAI Publication No. 2002-184159 and Jpn. Pat. Appln. KOKAI Publication No. 2004-104337). The semiconductor storage medium is randomly accessible, and hence in a video data processing apparatus in which a semiconductor storage medium is used, if video data is subjected to reproduction or the like from an arbitrary position, a far higher-speed operation than that of the tape system is enabled.

However, even in the video data processing apparatus in which a semiconductor storage medium is used, in the case where video data of high image quality and large volume is reproduced, although an instruction to start reproduction is issued, it takes some time to actually start a reproduction operation. Thus, in order to improve the operability of the user, a further higher-speed operation is demanded.

BRIEF SUMMARY OF THE INVENTION

An object of the present invention is to provide a video data processing apparatus and video data processing method capable of quickly starting a reproduction operation of video data.

According to an aspect of the present invention, there is provide a video data processing apparatus comprising: a reading unit for reading video data from a video data file recorded on a randomly accessible storage medium in response to a first control signal, and for reading position data indicating a frame position of the video data in the video data file from the video data file recorded on the storage medium in response to a second control signal; a memory for storing the position data read by the reading unit; and a controller for controlling the reading unit by outputting the second control signal before the outputting of the first control signal, and for controlling the reading unit by outputting the first control signal with a designation of particular video data to be read indicated by the position data stored in the memory, in response to a request to execute a process to the video data file.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a block diagram showing the structure of the video data processing apparatus of FIG. 1.

FIG. 8 is a flowchart showing a processing operation to be performed when the controller of the video data processing apparatus according to a second embodiment of the present invention stores index data in the RAM.

FIG. 9 is a view showing position information tables of index data to be stored in the storage areas of the RAM by the processing operation shown in FIG. 8.

FIG. 10 is a flowchart showing a processing operation of the controller to be performed when the video data processing apparatus according to a second embodiment receives an instruction to start reproduction.

FIG. 11 is a view showing index data to be stored in the storage areas of the RAM at the time of the reproduction processing shown in FIG. 10.

FIG. 12 is a flowchart showing a processing operation of the controller to be performed when the video data processing apparatus according to a second embodiment receives an instruction to start reproduction.

FIG. 14 is a view showing position information tables stored in the RAM shown in FIG. 3.

FIG. 16 is a view showing a display example of thumbnail images of the display unit of FIG. 3.

DETAILED DESCRIPTION OF THE INVENTION

Embodiments of a video data processing apparatus according to the present invention will be described below in detail while referring to the accompanying drawings.

First Embodiment

Figure 1:
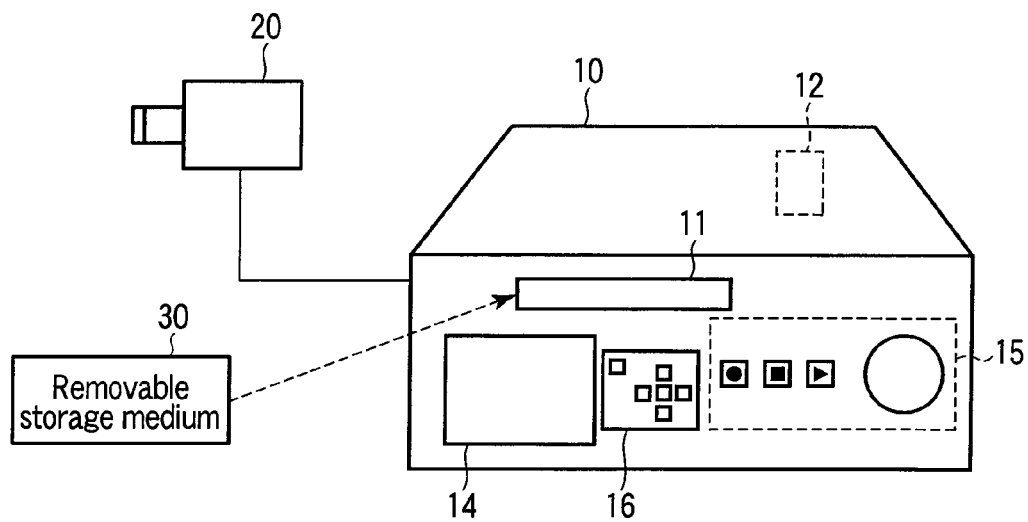
FIG. 1 is a view of a video data processing apparatus according to a first embodiment of the present invention.

FIG. 1 is an outline view of a video data processing apparatus 10 according to a first embodiment of the present invention. A camera 20 is connected to the video data processing apparatus 10 in FIG. 1. A video image or picture image taken by the camera 20 is captured in the video data processing apparatus 10. The captured image is recorded on a removable storage medium 30 or a built-in storage medium 12 as a video data file. The storage medium 30 is inserted into an insertion opening 11. The storage medium 12 is incorporated in the apparatus main body.

As the storage media 12 and 30, a nonvolatile semiconductor memory, hard disk and the like which are randomly accessible are used. The nonvolatile semiconductor memory is, for example, a flash memory or the like. The flash memory is provided with the advantage of rewritability and high random accessibility. Further as the flash memory is provided with no mechanical moving part unlike a tape and optical disk drive, the flash memory is excellent in resistance against vibration and the like.

A display unit 14, a video operation unit 15, and a screen operation unit 16 are provided on a main body front panel of the video data processing apparatus 10.

The display unit 14 is constituted of, for example, a Liquid Crystal Display (LCD). The display unit 14 displays, for example, setup information of the video data processing apparatus 10.

The video operation unit 15 is provided with various buttons and a dial. The user can input an instruction to start reproduction or instruction to stop reproduction of a video data file recorded on the storage medium 12 or 30 by operating these buttons. Further, the user can carry out adjustment or the like of the reproduction speed by operating the dial.

The screen operation unit 16 is provided with various buttons. The user can input an instruction to start reproduction of the video data file recorded on the storage medium 12 or 30 by operating these buttons.

Figure 2:
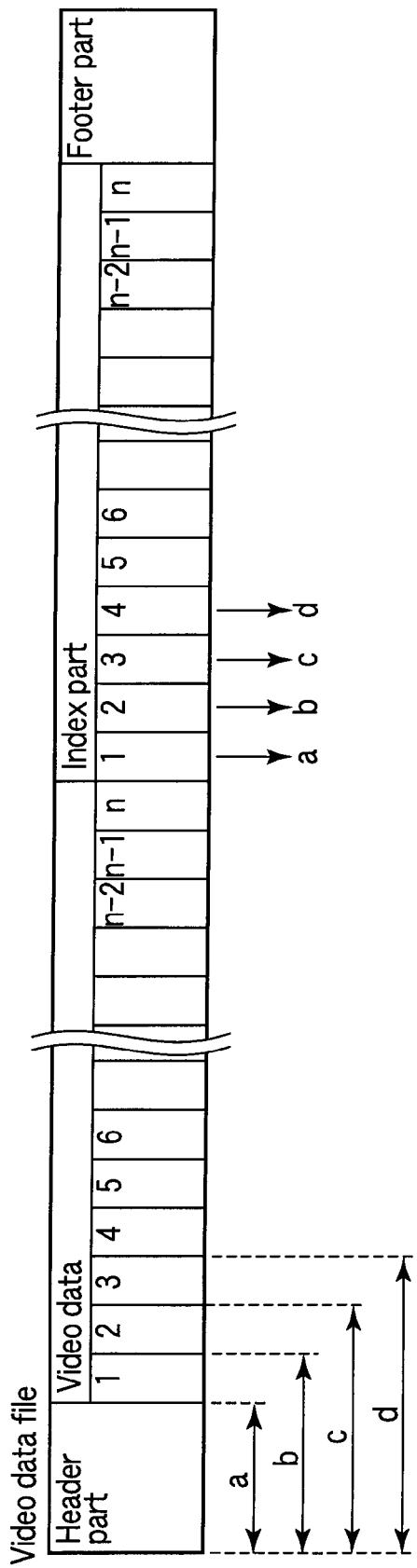
FIG. 2 is a view showing the structure of a video data file recorded on the storage medium shown in FIG. 1.

FIG. 2 is a schematic view showing the structure of the video data file recorded on the storage medium 30. The video data file in FIG. 2 is provided with a header part, video data part, index part, and footer part. The header part stores therein attribute data such as a format type and the like of the video data file. The video data part stores therein a video data main body, and is divided into data items in units of frames. At this time, the data length of each video data item differs from each other. The index part stores therein data lengths a, b, c, d . . . from the head position of the file to the head positions of the respective video data items as index data. The footer part indicates the end of the video data file.

FIG. 3 is a view showing the functional configuration of the video data processing apparatus 10 according to the embodiment of the present invention. The video data processing apparatus 10 is provided with a controller 17 constituted of a Central Processing Unit (CPU) such as a microprocessor or the like. The controller 17 is connected to an interface unit 18 for the storage medium 30, interface unit 19 for the storage medium 12, encoder 110, decoder 111, input unit 112, output unit 113, and display unit 14 through a bus. Further, the video operation unit 15, screen operation unit 16, and a Random Access Memory (RAM) 114 are connected to the controller 17. The storage medium 30 is connected to the interface unit 18, and storage unit 12 is connected to the interface unit 19. A video data file is recorded on the storage medium 30.

The interface unit 18 reads index data and video data of the video data file recorded on the storage medium 30 in accordance with an instruction from the controller 17.

Figure 4:
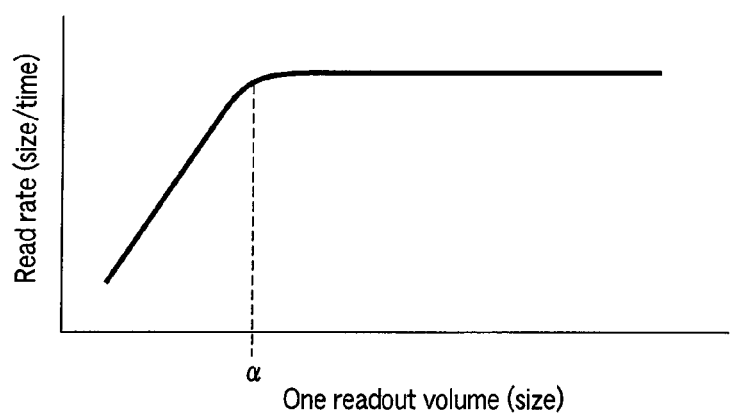
FIG. 4 is a view showing the read rate in the case where the interface unit shown in FIG. 3 reads data from a removable storage medium.

FIG. 4 is a view showing the read rate in the case where the interface unit 18 reads data from the storage medium 30. As shown in FIG. 4, when the one readout volume is equal to the volume α a or larger, the read rate is saturated at substantially a fixed value. As a result of this, when the data is read at a readout volume smaller than the readout volume α, the read rate is lower than the saturated value, and it can be seen that the reading is inefficient. Conversely, when the readout volume is made equal to or larger than the readout volume α, it is possible to read the data efficiently. The interface unit 18 according to this embodiment reads index data of the volume α from the storage medium 30 by one readout operation.

The RAM 114 is provided with a storage area of the volume α. The RAM 114 stores the index data read by the interface unit 18 in the storage area. Further, the RAM 114 outputs the index data stored in the storage area to the controller 17 in accordance with an instruction from the controller 17.

The decoder 111 decodes the video data read by the interface unit 18, and outputs the decoded video data to the output unit 113. An external monitor is connected to the output unit 113, and the decoded signal is output to the external monitor through the output unit 113.

When the storage medium 30 is connected to the video data processing apparatus 10, the controller 17 issues an instruction to read the index data of the video data file from the storage medium 30 to the interface unit 18. The read index data is stored in the RAM 114.

When a reproduction start instruction is input from the video operation unit 15 or screen operation unit 16, the controller 17 reads one index data item from the storage area of the RAM 114. Further, the controller 17 issues an instruction to read video data indicated by the index data from the storage medium 30 to the interface unit 18. The read video data is output to the decoder 111.

Figures 5, 6:
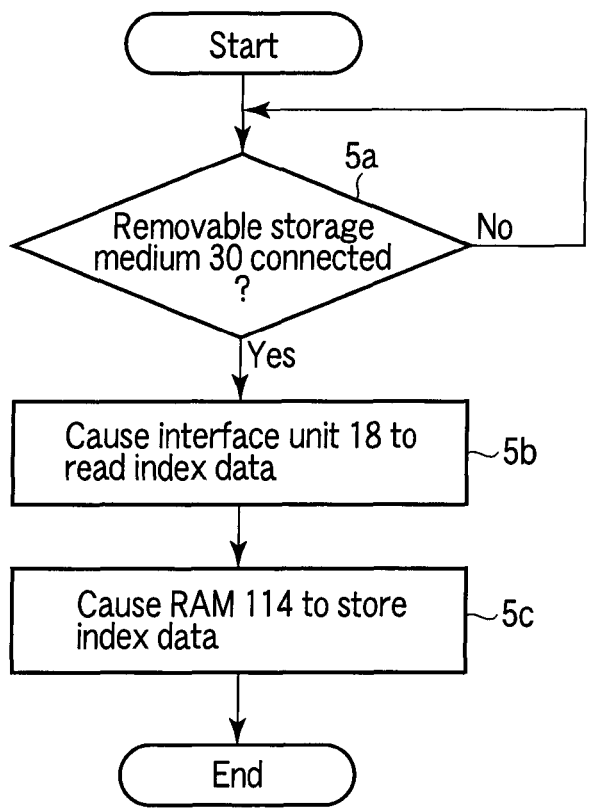
FIG. 5 is a flowchart showing a processing operation to be performed when the controller of FIG. 3 stores index data in a RAM.
FIG. 6 is a view showing a position information table of index data stored in a storage area of a RAM by the processing operation shown in FIG. 5.

The processing operation of the controller 17 of the video data processing apparatus 10 configured as described above will be described below in detail. FIG. 5 is a flowchart showing the processing operation to be carried out when the controller 17 stores the index data in the RAM 114.

First, the controller determines whether or not the storage medium 30 has been connected to the apparatus 10 (step 5a). When the storage medium 30 has been connected to the apparatus 10 (Yes in step 5a), the controller 17 issues an instruction to read the index data from the storage medium 30 to the interface unit 18 (step 5b). The controller 17 causes the RAM 114 to store the read index data in the storage area thereof (step 5c), and terminates the processing.

FIG. 6 is a view showing a position information table of the index data stored in the storage area of the RAM by the processing operation shown in FIG. 5. In the storage area, n index data items corresponding to the volume α are stored. In the position information table, the numbers 1 to n of frames from the leading head position of the video data file, and the data lengths (byte numbers) from the leading head position to the head positions of the individual video data items are made to correspond to each other.

Figure 7:
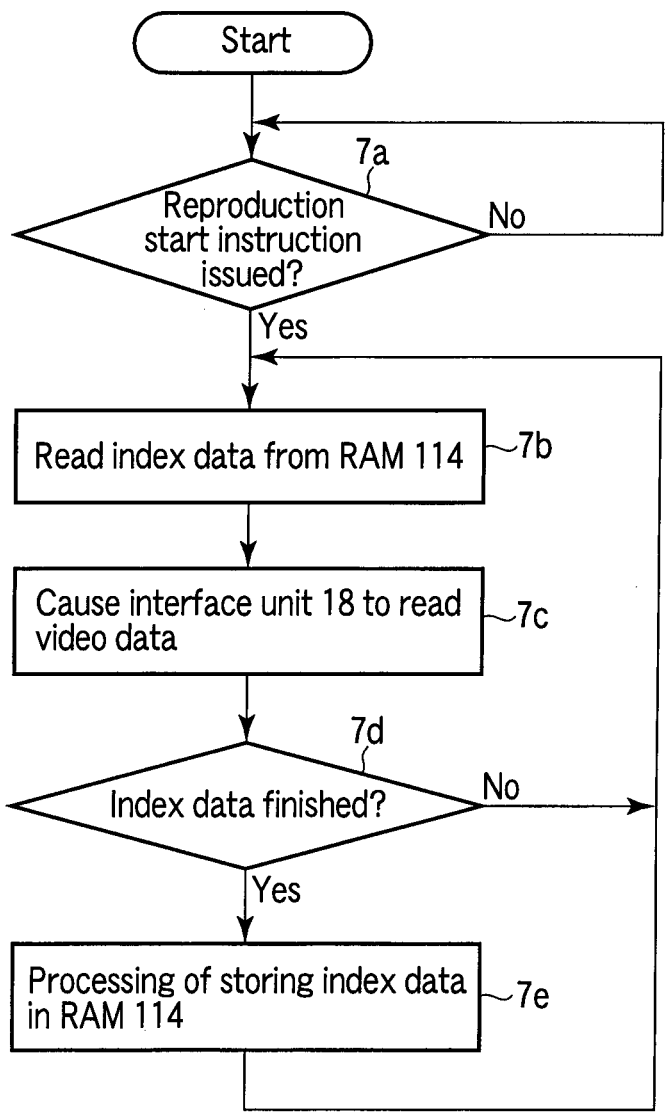
FIG. 7 is a flowchart showing a processing operation of the controller to be performed when the video data processing apparatus shown in FIG. 1 receives an instruction to start reproduction.

FIG. 7 is a flowchart showing the processing operation of the controller 17 to be carried out when the video data processing apparatus 10 receives a reproduction start instruction.

First, the controller 17 determines whether or not a reproduction start instruction has been issued from the video operation unit 15 or screen operation unit 16 (step 7a). When the reproduction start instruction has been issued (Yes in step 7a), the controller 17 reads one index data item stored in the RAM 114 (step 7b). Further, the controller 17 issues an instruction to read video data of one frame indicated by the read index data item to the interface unit 18 (step 7c). The read video data is output to the decoder 111.

Subsequently, the controller 17 determines whether or not all the index data items of the volume α stored in the RAM 114 have been read (step 7d). When all the index data items of the volume α stored in the RAM 114 have been read (Yes in step 7d), the controller 17 issues an instruction to read index data which has not been stored to the interface unit 18. Then, the controller 17 stores the read index data in the RAM 114 (step 7e). After step 7e, the controller 17 moves the processing to step 7b to repeat the reproduction processing. Further, when not all the index data items stored in the RAM 114 have been read (No in step 7d), the controller moves the processing to step 7b to repeat the reproduction processing. This reproduction processing is stopped when the controller 17 receives a reproduction stop instruction from the video operation unit 15.

As described above, the video data processing apparatus 10 according to the first embodiment stores in advance the index data of the video data file recorded on the storage medium 30 in the RAM 114 prior to reproduction of the video data. If the reproduction start instruction is input, the video data processing apparatus 10 reads the index data from the RAM 114, and reproduces the video data designated by the index data.

In general, it is known that reading of data stored at a predetermined position of the RAM 114 enables higher-speed reading than reading of data stored in the storage medium as a file. That is, in the video data processing apparatus 10 according to this embodiment, the system in which the index data is read from the RAM 114 is employed, whereby the time to read the index data is made shorter than in the conventional apparatus when the video data is reproduced. This makes it possible to quickly read desired video data from the storage medium. As a result of this, for example, if the reproduction system is switched from the forward reproduction to the reverse reproduction, it is possible to quickly read the corresponding video data from the storage medium, and hence it becomes possible to shorten the time necessary for switching of the reproduction system. Further, if the reproduction system is switched from the one-time reproduction to the fast-forward reproduction too, it becomes possible to shorten the time necessary for the switching. That is, the video data processing apparatus 10 can improve the response to the reproduction operation.

If the removable storage medium 30 of the attachable/detachable type is connected to the video data processing apparatus 10, the apparatus 10 reads the index data of the video data file recorded on the storage medium 30. Then the apparatus 10 stores the index data in the RAM 114. As a result of this, it becomes unnecessary for the video data processing apparatus 10, unlike the conventional apparatus, to read the index data from the file recorded on the storage medium 30 after a reproduction start instruction is input by the user. This enables the video data processing apparatus 10 to shorten the time from the reproduction start instruction to the start of the reproduction operation.

The interface unit 18 of the video data processing apparatus 10 according to the embodiment reads the index data of the volume α by one readout operation on the basis of the relationship between the read rate and readout volume. Further, the storage area of the RAM 114 is provided with the capacity of the same size as the readout volume α. As a result of this, it becomes possible for the video data processing apparatus 10 to efficiently read the index data from the removable storage medium 30. By virtue of these facts, it is possible for the video data processing apparatus 10 according to the present invention to quickly start the reproduction operation of the video data.

It should be noted that in the case where the video data file which becomes an object of the reproduction is selected, it is also possible to quickly start the reproduction operation of the video data by reading the index data of the video data in the vicinity of the leading head in advance, and reading the remaining index data when the reproduction start instruction is input.

Second Embodiment

In a second embodiment, the description will be given of the case where a removable storage medium 30 stores therein one video data file or a plurality of video data files, and a RAM 114 is provided with a plurality of storage areas each of which is provided with the capacity α. A controller 17 stores index data read from the removable storage medium 30 in the respective storage areas of the RAM 114.

FIG. 8 is a flowchart showing the processing operation to be carried out when the controller 17 stores the index data in the RAM 114.

First, the controller 17 determines whether or not the removable storage medium 30 has been connected to the video data processing apparatus 10 (step 8a). When the storage medium 30 has been connected to the apparatus 10 (Yes in step 8a), the controller 17 issues an instruction to read index data of the volume α from the storage medium 30 to an interface unit 18 (step 8b).

When the index data is read from the storage medium 30, the controller 17 stores the index data in the storage area of the RAM 114 (step 8c), and determines whether or not there is any empty space in the plurality of storage areas of the RAM 20 (step 8d). When there is an empty space in the storage areas of the RAM 20 (Yes in step 8d), the controller moves the processing to step 8b, and repeats the processing of step 8b and step 8c until the empty space is eliminated from the RAM 20.

When there is no empty space in the storage areas of the RAM 20 (No in step 8d), the processing is terminated. It should be noted if all the index data items in the video data file have already been read, the processing is terminated even if there is an empty space in the storage areas.

FIG. 9 is a view showing position information tables of the index data to be stored in the respective storage areas of the RAM 114 by the processing operation shown in FIG. 8. The RAM 114 is provided with the storage areas 1 to N. In each of the storage areas 1 to N, n index data items corresponding to the volume α are stored. In each of the position information tables, the number of frames 1 to n, n+1 to 2n, . . . , or x+1 to x+n from the leading head position of the video data file, and the data lengths (byte numbers) from the leading head position of the video data file to the head positions of the individual video data items are made to correspond to each other. It should be noted that it is possible for the RAM 114 to store therein all the index data items in the file if the video data file is a file of a small volume.

FIGS. 10 and 12 are flowcharts each showing the processing operation of the controller 17 to be carried out when the video data processing apparatus 10 receives a reproduction start instruction. Here, if a plurality of storage areas are present in the RAM 114, the processing of storing index data in the RAM 114 during the reproduction processing differs depending on the reproduction system of the video data. FIG. 10 shows the case where the reproduction system of the video data is compatible only with the forward reproduction.

The controller 17 determines whether or not a reproduction start instruction has been issued from the video operation unit 15 or screen operation unit 16 (step 10a). When the reproduction start instruction has been issued (Yes in step 10a), the controller 17 reads one index data item stored in the storage area 1 of the RAM 114 (step 10b). Further, the controller 17 issues an instruction to read video data of one frame indicated by the read index data item to the interface unit 18 (step 10c). The read video data is output to a decoder 111.

Subsequently, the controller 17 determines whether or not all the index data items of the volume α stored in the storage area 1 of the RAM 114 have been read (step 10d). If all the index data items of the volume α stored in the storage area 1 have been read (Yes in step 10d), the controller 17 refers to the index data of the storage area 2 to carry out reproduction processing, and simultaneously causes the interface unit 18 to read index data which has not been stored yet, the index data being in the video data file that is now being reproduced. Then the controller 17 stores the read index data in the storage area 1 of the RAM 114 (step 10e). After completion of step 10e, the controller 17 moves the processing to step 10b to repeat the reproduction processing. In step 10d, if not all the index data items stored in the storage area 1 have been read (No in step 10d), the controller 17 moves the processing to step 10b to repeat the reproduction processing. This reproduction processing is stopped when the controller 17 receives a reproduction stop instruction from the video operation unit 15.

FIG. 11 is a view showing the index data items stored in the storage areas of the RAM 114 at the time of the reproduction processing shown in FIG. 10. If the video data is reproduced by referring to the index data of the number of frames n in the storage area 1, the controller 17 refers to the index data of the number of frames n+1 in the storage area 2 to reproduce the video data. When the controller 17 moves to the storage area 2, the controller 17 stores index data which has not been stored yet, the index data being in the video data file that is now being reproduced, in the storage area 1. This causes index data which are ahead of the current reproduction position to be always stored in the RAM 114. It should be noted that the controller 17 refers to the index data stored in each of the storage areas 1 to N to reproduce the video data until the controller 17 receives a reproduction stop instruction.

FIG. 12 is a flowchart showing the processing operation of the controller 17 to be carried out when the video data processing apparatus 10 receives a reproduction start instruction in the case where the reproduction system of the video data is compatible with both the forward reproduction and reverse reproduction. It should be noted that in FIG. 12, the same processing flows as FIG. 10 are denoted by the same step numbers as FIG. 10.

In step 10e, the controller 17 determines whether or not all the index data items of the volume α stored in the storage area of the RAM 114 have been read. If all the index data items stored in the storage area have been read (Yes in step 10e), the controller 17 refers to the index data in the next storage area to carry out reproduction processing, simultaneously causes the interface unit 18 to read index data which has not been stored yet, the index data being in the video data file that is now being reproduced. Then the controller 17 stores the index data in the predetermined storage area (step 12a).

Figure 13:
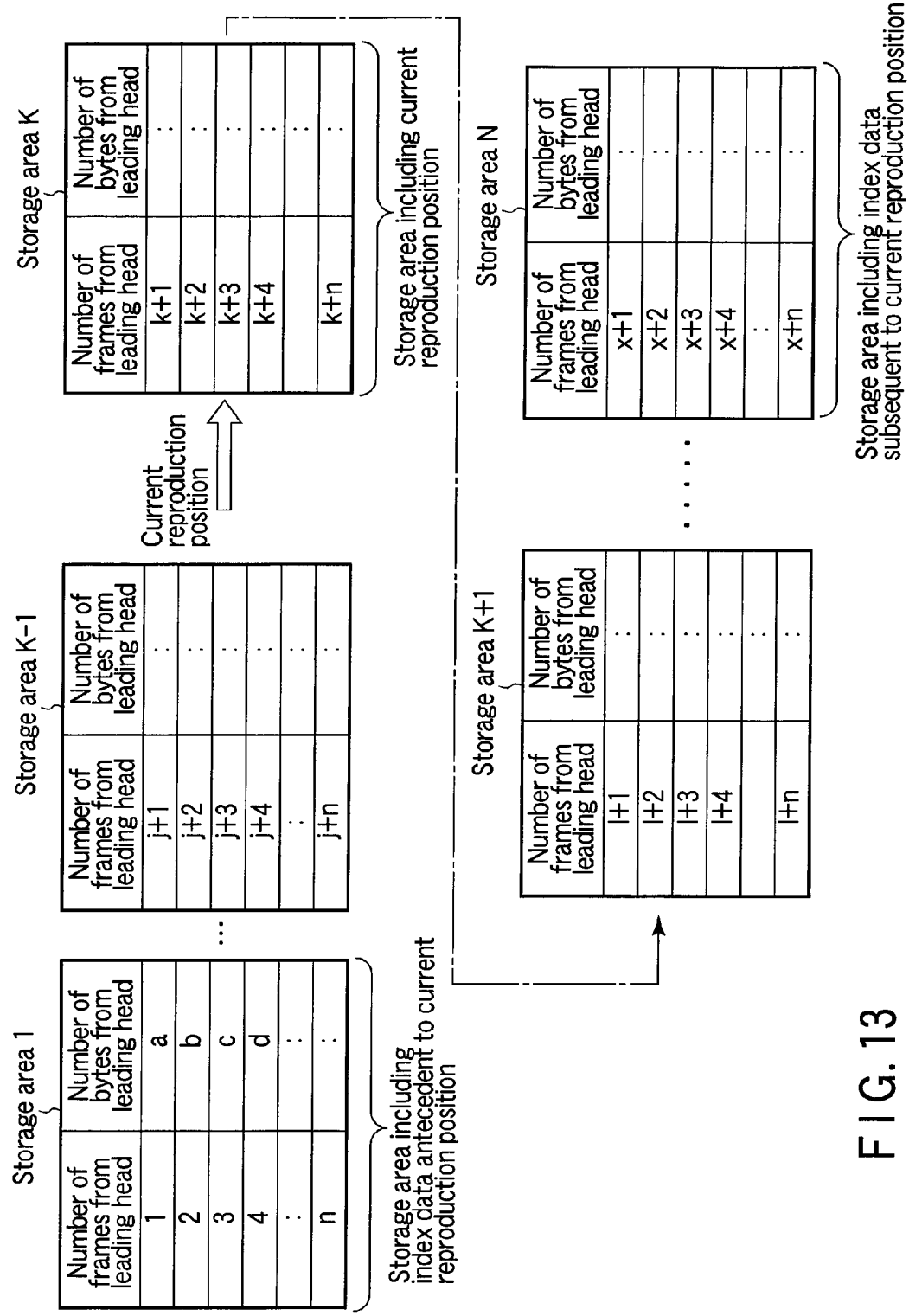
FIG. 13 is a view showing index data to be stored in the storage areas of the RAM at the time of the reproduction processing shown in FIG. 12.

FIG. 13 is a view showing the index data items stored in the storage areas of the RAM 114 at the time of the reproduction processing shown in FIG. 12.

In the case where the reproduction system of the video data processing apparatus is the forward reproduction, when the video data is reproduced by referring to the index data of the number of frames k+n in the storage area K, the controller 17 refers to the index data of the number of frames l+1 in the storage area K+1 to reproduce the video data. When the controller moves to the storage area K+1, the controller 17 stores, in the storage area 1, index data which has not been stored yet, the index data being in the video data file that is now being reproduced.

In the case where the reproduction system of the video data processing apparatus is the reverse reproduction, when the video data is reproduced by referring to the index data of the number of frames k+1 in the storage area K, the controller 17 refers to the index data of the number of frames j+n in the storage area K−1 to reproduce the video data. When the controller moves to the storage area K−1, the controller 17 stores, in the storage area N, index data which has not been stored yet, the index data being in the video data file that is now being reproduced.

By storing the index data in the storage areas of the RAM 114 in the manner described above, it becomes possible for the video data processing apparatus 10 to quickly cope with the forward reproduction and reverse reproduction of the video data.

Furthermore, in the case where a plurality of video data files are recorded on the storage medium 30, and a video data file to be subjected to reproduction processing subsequently to the video data file which is now being reproduced is already determined, the controller 17 may store in advance the index data of the video data file to be reproduced next in the storage area of the RAM 114 as shown in FIG. 14. This becomes useful for reducing the reading processing, and improvement of the operation response when a plurality of reproduction systems such as fast-forward reproduction, reverse reproduction, and the like are applied to a plurality of files.

As described above, in the second embodiment, the RAM 114 includes a plurality of storage areas each of which is provided with the capacity α. Then the controller 17 stores the index data read from the video data file in each storage area. Further, if a reproduction start instruction is issued, the controller 17 reproduces video data indicated by the index data stored in the storage area.

If an instruction to change the reproduction system is input, the controller 17 refers also to the index data stored in the other storage area to cope with any change in the reproduction system. That is, the index data which is necessary for the reproduction operation and the change of the reproduction system is read not from the file recorded on the storage medium, but from the storage area of the RAM 114. As a result of this, even if the read position of the video data is changed concomitantly with the change of the reproduction system such as a temporary halt of the reproduction operation, restart, change of the reproduction speed, jump of the reproduction position, and the like, it becomes possible to shorten the time to read the index data, and improve the responsivity to the operation.

Accordingly, it is possible for the video data processing apparatus according to the present invention to quickly cope with the processing operation such as the change of the reproduction system, and the like.

Third Embodiment

In a third embodiment, the case where a plurality of video data files, and a thumbnail image data file in which thumbnail images (representative images indicated by still images of head parts of images) of the video data files are stored are recorded on a removable storage medium 30 will be described.

At this time, a display unit 14 displays thumbnail images of the video data file recorded on the storage medium 30, and a cursor used to select a thumbnail image. Further, a screen operation unit 16 receives an operation instruction of the cursor displayed on the display unit 14, and selection instruction of the thumbnail image displayed on the display unit 14 from the user by means of various buttons provided thereon.

An interface unit 18 reads index data and video data of the video data file recorded on the storage medium 30 in accordance with an instruction from a controller 17. Further, the interface unit 18 reads thumbnail image data of the thumbnail image data file in accordance with an instruction from the controller 17.

A RAM 114 is provided with a storage area of the capacity α. Further, the RAM 114 stores the index data read by the interface unit 18 in the storage area.

A decoder 111 decodes the video data read by the interface unit 18, and outputs the decoded video data to an output unit 113. Further, the decoder 111 decodes the thumbnail image data read by the interface unit 18, and outputs the decoded thumbnail image data to the display unit 14.

When the storage medium 30 is connected to the apparatus 10, the controller 17 issues an instruction to read the thumbnail image data of the thumbnail image data file from the storage medium 30 to the interface unit 18. The controller 17 causes the interface unit 18 to output the read thumbnail image data to the decoder 111.

When a selection instruction of the thumbnail image displayed on the display unit 14 is input from the screen operation unit 16, the controller 17 issues an instruction to read the index data of the video data file of the thumbnail image from the storage medium 30 to the interface unit 18.

When a reproduction start instruction is input from a video operation unit 15 or the screen operation unit 16, the controller 17 reads one index data item from the RAM 114. Further, the controller 17 issues an instruction to read video data indicated by the index data item from the storage medium 30 to the interface unit 18. The controller 17 causes the interface unit 18 to output the read video data to the decoder 111.

Figure 15:
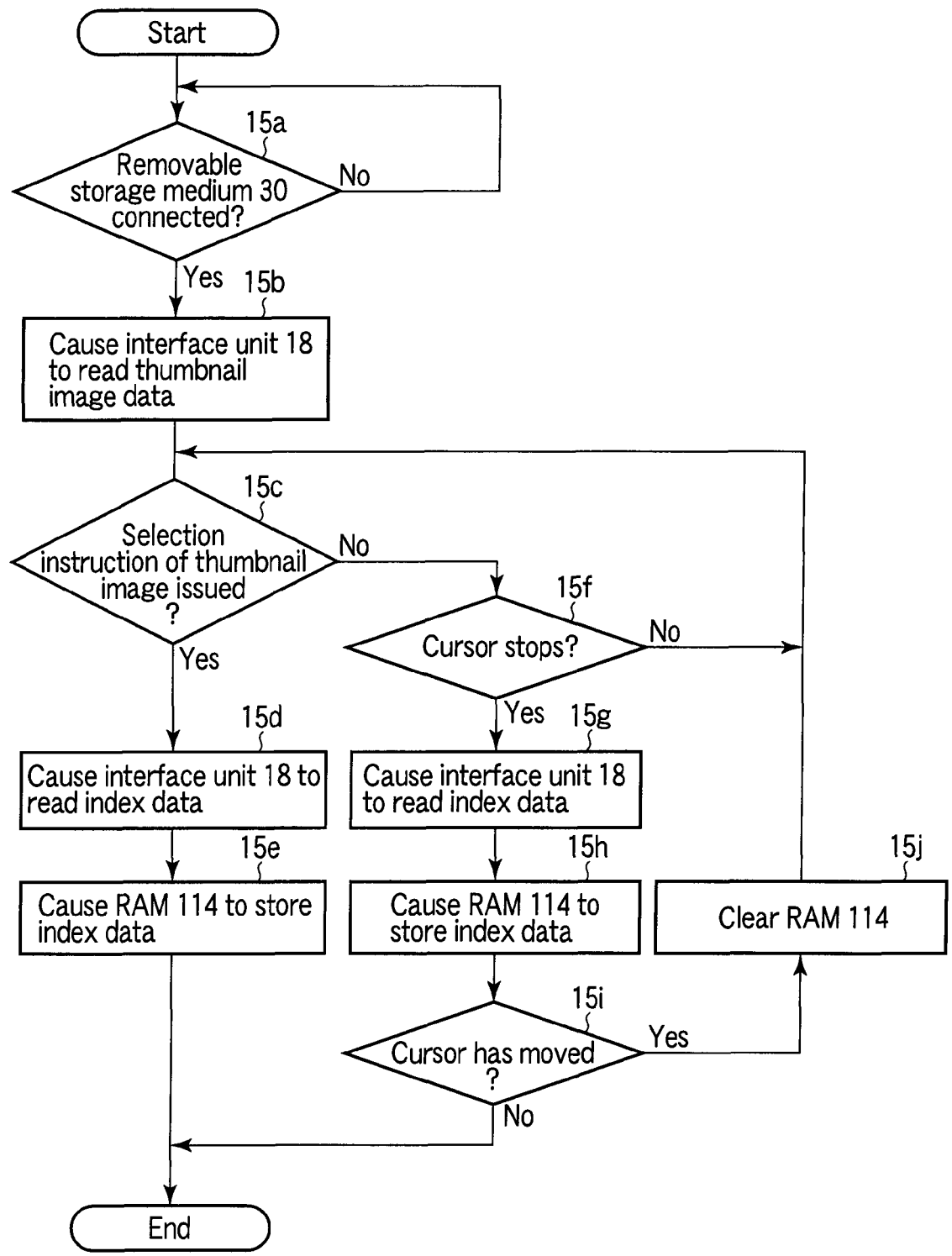
FIG. 15 is a flowchart showing a processing operation to be performed when the controller of the video data processing apparatus according to a third embodiment of the present invention stores index data in the RAM.

The processing operation of the controller 17 of the video data processing apparatus 10 configured as described above will be described below in detail. FIG. 15 is a flowchart showing the processing operation to be carried out when the controller 17 stores the index data in the RAM 114.

First, the controller 17 determines whether or not the storage medium 30 has been connected to the apparatus 10 (step 15a). When the storage medium 30 has been connected to the apparatus 10 (Yes in step 15a), the controller 17 issues an instruction to read the thumbnail image data of the thumbnail image data file from the storage medium 30 to the interface unit 18 (step 15b). The read thumbnail image data is decoded by the decoder 111, and is output to the display unit 14.

FIG. 16 is a schematic view showing a display example of thumbnail images of the display unit 14 in the third embodiment of the present invention. An example in which six thumbnail images are displayed on the display unit 14, and a cursor is positioned on a thumbnail image 5 is shown.

After completion of step 15b, the controller 17 determines whether or not a selection instruction has been issued from the screen operation unit 16 with respect to the thumbnail images displayed on the display unit 14 (step 15c). When a selection instruction has been issued with respect to the thumbnail images (Yes in step 15c), the controller 17 issues an instruction to read index data of the video data file indicated by the thumbnail image to the interface unit 18 (step 15d). Further, the controller 17 stores the read index data in the RAM 114 (step 15e), and terminates the processing.

When no selection instruction has been issued with respect to the thumbnail images in step 15c, the controller 17 determines whether or not the cursor on the display unit 14 stops at an arbitrary thumbnail image for a predetermined period of time or longer (step 15f). When the cursor on the display unit 14 does not stop at an arbitrary thumbnail image for a predetermined period of time or longer (No in step 15f), the controller moves the processing to step 15c.

When the cursor on the display unit 14 stops at an arbitrary thumbnail image for a predetermined period of time or longer (Yes in step 15f), the controller 17 issues an instruction to read index data of the video data file of the thumbnail image at which the cursor stops to the interface unit 18 (step 15g). Further, the controller 17 causes the RAM 114 to store the read index data therein (step 15h).

Subsequently, the controller 17 determines whether or not the cursor has moved from the thumbnail image (step 15i). When the cursor has moved from the thumbnail image (Yes in step 15i), the controller 17 erases the index data stored in the RAM 114 (step 15j), and moves the processing to step 15c. When the cursor has not moved from the thumbnail image (No in step 15i), the controller 17 terminates the processing.

As a result of this, from among the plurality of video data files recorded on the storage medium 30, the index data of the video data file desired to be reproduced is stored in the RAM 114.

When a reproduction instruction of the video data file is issued, the controller 17 carries out the reproduction processing shown in FIG. 7.

As described above, if the plurality of video data files are recorded on the storage medium 30, the video data processing apparatus 10 according to the third embodiment displays the thumbnail images of the individual video data files on the display unit 14. Further, the user is made to refer to the displayed thumbnail images, and select a video data file which is an object of the reproduction processing. At this time, when the cursor stops at an arbitrary thumbnail image on the display unit 14 for a predetermined period of time or more, the controller 17 reads the index data of the video data file, and stores the index data in the RAM 114. As a result of this, it is not necessary to read the index data items of all the video data files in the storage medium 30, and the reading operation of the index data is carried out before the reproduction start instruction is issued, whereby it becomes possible to realize a reproduction operation excellent in response to a reproduction start operation.

Accordingly, it is possible for the video data processing apparatus according to the present invention to quickly start a reproduction operation of video data.

Other Embodiments

It should be noted that the present invention is not limited to the above-mentioned embodiments. For example, in each of the above embodiments, an example in which video data is reproduced from a video data file recorded on the removable storage medium 30 has been described. However, even a case where sound data is reproduced from a sound data file recorded on the storage medium 30 is also practicable.

In each of the above embodiments, an example in which the recording position of the video data is expressed by the data length from the leading head of the video data file has been described. However, the expression of the recording position of the video data is not limited to the above method. For example, even a case where the recording position of the video data is expressed by a data length of each frame of the video data is also practicable. However, it is necessary to pay attention to the fact that data lengths must be cumulatively added up in order to confirm the recording position of the video data.

In the above embodiment, an example in which the video data and control signal are transmitted by a bus has been described. However, even a case where the video data and control signal are separately transmitted by different buses is also practicable.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video data processing apparatus comprising:
    a reading unit configured to read a video data item from a video data file in response to a first control signal, and to read index data items from the video data file in response to a second control signal, the video data file including a video data part consisting of 1 to n video data items and an index part consisting of 1 to n index data items, wherein for each video data item there is a respective index data item consisting of a data length from a head position of the file to a head position of the respective video data item;
    a memory configured to store the index data items read by the reading unit; and
    a controller configured to control the reading unit by outputting the second control signal for reading the index data items consisting of the data length from the head position of the file to the head position of the respective video data item from the video data file in response to connection of a randomly accessible storage medium in which the video data file is recorded to the video data processing apparatus, wherein the controller is arranged to output the second control signal for reading the index data items consisting of the data length from the head position of the file to the head position of the respective video data item from the video data file before outputting the first control signal for reading the video data item from the video data file such that the memory stores in advance the index data items of the video data file prior to reproduction of video data; wherein
    the controller is configured to, in response to a request to execute a process to the video data file, read an index data item from the memory, and issue the first control signal to read a video data item indicated by the read index data item from the video data file with a designation of the video data item to be read.

2. The video data processing apparatus according to claim 1, wherein
    the controller is configured to control the reading unit, in the event that a plurality of video data files are recorded on the storage medium, by outputting the second control signal in response to the connection of the storage medium and the selection of a video data file to be read from among the plurality of video data files.

3. The video data processing apparatus according to claim 2, wherein the storage medium further stores a thumbnail image data file including thumbnail image data items to display thumbnail images of the video data files, the video data processing apparatus further comprising:
    a display unit configured to display the thumbnail images; and
    an instruction input unit configured to receive an instruction to select a thumbnail image from among the thumbnail images displayed on the display unit to generate an instruction signal, the selected thumbnail image representing a selected video data file, wherein
    the reading unit is configured to read the thumbnail image data items from the thumbnail image data file in response to a third control signal, to output the thumbnail image data items to the display unit and to read the index data items from the selected video data file; and
    the controller is configured to control the reading unit by outputting the third control signal in response to the connection of the storage medium and to control the reading unit by outputting the second control signal with a designation of the selected video data file indicated by the instruction signal in response to the instruction signal.

4. The video data processing apparatus according to claim 2, wherein the storage medium further stores a thumbnail image data file including thumbnail image data items to display thumbnail images of the plurality of video data files, the video data processing apparatus further comprising:
    a display unit configured to display the thumbnail images; and
    a selection operation unit configured to carry out a selection operation for the thumbnail images displayed on the display unit, wherein
    the reading unit is configured to read the thumbnail image data items from the thumbnail image data file in response to a third control signal, to output the thumbnail image data items to the display unit and to read the index data items from a selected video data file; and
    the controller is configured to control the reading unit by outputting the third control signal in response to the connection of the storage medium, and to control the reading unit by outputting the second control signal with a designation of the selected video data file indicated by the selection operation when the selection operation for the displayed thumbnail images stops at an arbitrary thumbnail image for a preset period of time or more.

5. The video data processing apparatus according to claim 1, wherein
    the controller is configured to control the reading unit, in the event that a read rate for reading data from the storage medium is saturated when data of a predetermined volume or larger is read, and a storage area in the memory has volume corresponding to at least the predetermined volume and stores the index data items of the predetermined volume, by outputting the second control signal to read the index data items of at least the predetermined volume.

6. The video data processing apparatus according to claim 5, wherein
    the memory is provided with a plurality of storage areas; and
    the controller is configured to control the reading unit by outputting the second control signal to repetitively read the index data items in units of the predetermined volume, and to control the memory to store the index data items of the predetermined volume in each of the storage areas in sequence.

7. The video data processing apparatus according to claim 6, wherein
the controller is configured to control the reading unit by outputting the first control signal with a designation of the video data item to be read indicated by the index data items stored in a first storage area in response to the execution request, to control the reading unit to read the video data item by referring to the index data item stored in a second storage area if the index data items stored in the first storage area end with the index data item of the video data item being read, to control the reading unit by outputting the second control signal to read new index data items in response to the reading of the video data item indicated by the index data items stored in the second storage area, and to control the memory to store the new index data items in the first storage area.

8. The video data processing apparatus according to claim 6, wherein
the controller is configured to control the reading unit by outputting the second control signal if a next video data file next to the video data file currently read is determined to read next index data items of the next video data file, and to control the memory to store the next index data items in an unassigned storage area of the plurality of storage areas.

9. A video data processing method comprising:
reading a video data item from a video data file in response to a first control signal, and reading index data items from the video data file in response to a second control signal, the video data file including a video data part consisting of 1 to n video data items and an index part consisting of 1 to n index data items, wherein for each video data item there is a respective index data item consisting of a data length from a head position of the file to a head position of the respective video data item;
storing the index data items from the video data file;
outputting the second control signal for reading the index data items consisting of the data length from the head position of the file to the head position of the respective video data item from the video data file in response to connection of a randomly accessible storage medium in which the video data file is recorded to the video data processing apparatus before outputting the first control signal for reading the video data from the video data file such that the index data items of the video data file are stored in a memory in advance prior to the reproduction of video data;
reading, in response to a request to execute a process on the video data file, an index data item from the memory;
issuing first control signal to read a video data item indicated by the read index data item from the video data file with a designation of the video data item to be read.

10. The video data processing method according to claim 9, further comprising:
in the event that a plurality of video data files are recorded on the storage medium,
reading index data items selected video data file to be read response to the connection of the storage medium and selection of the selected video data file from among the plurality of video data files;
storing the index data items; and
reading video data items indicated by the stored index data items from the selected video data file in response to a request to execute a process on the particular video data file.

11. The video data processing method according to claim 10, wherein the storage medium further stores a thumbnail image data file including thumbnail image data items to display thumbnail images of the video data files, the video data processing method further comprising:
reading the thumbnail image data items from the thumbnail image data file in response to the connection of the storage medium;
displaying the thumbnail images based on the read thumbnail image data items; and
reading index data items of a video data file selected in accordance with a selection instruction of a displayed thumbnail image.

12. The video data processing method according to claim 10, wherein the storage medium further stores a thumbnail image data file including thumbnail image data items to display thumbnail images of the plurality of video data files, the video data processing method further comprising:
reading the thumbnail image data items from the thumbnail image data file in response to the connection of the storage medium;
displaying the thumbnail images based on the read thumbnail image data items; and
reading index data items of a video data file indicated by the selection operation when the selection operation for the displayed thumbnail images stops at an arbitrary thumbnail image for a preset period of time or more.

13. The video data processing method according to claim 9, further comprising:
in the event that a read rate for reading data from the storage medium is saturated when data of a predetermined volume or larger is read,
reading the index data items of at least the predetermined volume in response to connection of the storage medium; and
storing the index data items of the predetermined volume.

14. The video data processing method according to claim 13, further comprising:
reading repetitively the index data items in units of the predetermined volume; and
storing in sequence the index data items read in units of the predetermined volumes.

15. A video data processing method according to claim 14, further comprising:
reading a particular video data item to be read indicated by stored index data items in response to the execution request; and
reading, if index data items of a predetermined volume end with index data items of video data item being read, video data items by referring to index data items included in a next predetermined volume,
reading new index data items in response to the reading of the video data item by referring to the index data item included in the next predetermined volume, and
storing the new index data items.

16. The video data processing method according to claim 14, further comprising:
if a next video data file next to the video data file currently read is determined,
reading next index data items of the next video data file, and
storing the index data items.

* * * * *